US011858368B1

(12) United States Patent
Carter et al.

(10) Patent No.: US 11,858,368 B1
(45) Date of Patent: Jan. 2, 2024

(54) MOBILE VEHICLE CHARGING STATION WITH INTEGRATED ENTERTAINMENT

(71) Applicant: Re-Volt EV LLC, Charlotte, NC (US)

(72) Inventors: Ronald Carter, Matthews, NC (US); Ken Harris, Charlotte, NC (US)

(73) Assignee: RE-VOLT EV LLC, Charlotte, NC (US)

( * ) Notice: Subject to any disclaimer, the term of this patent is extended or adjusted under 35 U.S.C. 154(b) by 0 days.

(21) Appl. No.: 18/123,646

(22) Filed: Mar. 20, 2023

(51) Int. Cl.
*B60L 53/37* (2019.01)
*B60S 3/00* (2006.01)

(52) U.S. Cl.
CPC .............. *B60L 53/37* (2019.02); *B60S 3/004* (2013.01); *B60L 2250/16* (2013.01)

(58) Field of Classification Search
CPC ................................. B60L 53/37; B60S 3/004
USPC ......................................................... 320/109
See application file for complete search history.

(56) References Cited

U.S. PATENT DOCUMENTS

| | | | |
|---|---|---|---|
| 8,643,329 B2 | 2/2014 | Prosser et al. | |
| 9,868,421 B2 | 1/2018 | Hassounah | |
| 10,099,566 B2 | 10/2018 | Wu et al. | |
| 10,227,016 B2 | 3/2019 | Sychov | |
| 10,532,663 B2 | 1/2020 | Ricci | |
| 10,828,770 B2 | 11/2020 | Zhao et al. | |
| 11,148,549 B1* | 10/2021 | Alan | B60L 53/36 |
| 11,279,252 B1* | 3/2022 | Alan | B60L 53/16 |
| 11,280,102 B2* | 3/2022 | Bates | B60L 53/38 |
| 11,312,257 B2 | 4/2022 | Lee et al. | |
| 11,318,857 B2 | 5/2022 | Westfall et al. | |
| 2011/0140658 A1* | 6/2011 | Outwater | B60L 53/35 320/109 |
| 2017/0267114 A1 | 9/2017 | Bianco et al. | |
| 2019/0054832 A1* | 2/2019 | Lin | H02J 7/0013 |
| 2020/0269835 A1* | 8/2020 | Hara | G08G 1/143 |
| 2020/0349617 A1* | 11/2020 | Rosas-Maxemin | G06N 3/045 |
| 2021/0311443 A1* | 10/2021 | Nakabayashi | H04L 12/283 |
| 2022/0024328 A1 | 1/2022 | Cameron | |
| 2022/0055495 A1* | 2/2022 | Labell | B60L 53/37 |
| 2022/0282512 A1* | 9/2022 | Shikano | E04H 6/24 |
| 2022/0294277 A1* | 9/2022 | Wolgemuth | B60L 53/38 |

FOREIGN PATENT DOCUMENTS

CN       111976515 A       8/2022

* cited by examiner

*Primary Examiner* — Suchin Parihar
(74) *Attorney, Agent, or Firm* — NEO IP

(57) ABSTRACT

An enclosure for charging an electric vehicle (EV) including an automatic vehicle moving system, which gradually moves the EV from one end of the enclosure to an opposite end of the enclosure. A charging chassis, including an EV charge connector, moves alongside the EV, charging it as the automatic vehicle moving system moves it along. The enclosure is also able to include an entertainment display in order to allow a driver to view media content while the vehicle is charging.

20 Claims, 8 Drawing Sheets

MOBILE VEHICLE CHARGING STATION WITH INTEGRATED ENTERTAINMENT

BACKGROUND OF THE INVENTION

1. Field of the Invention

The present invention relates to electric vehicle charging stations, and more specifically to electric vehicle charging stations with automatic movement of charging vehicles and integrated entertainment and food services systems.

2. Description of the Prior Art

It is generally known in the prior art to provide electric vehicle charging stations, especially for stationary vehicles at set parking locations. It is further known to provide electric vehicle charging stations with robotic arms able to automatically attach a charging cable to an electric vehicle in a particular charging location.

Prior art patent documents include the following:

U.S. Pat. No. 8,643,329 for Overhead mobile charger system for reaching and charging electric vehicles parked in a pair of adjacent and spaced-part rows of side-by-side parking spaces by inventors Prosser et al, filed Apr. 27, 2011 and issued Feb. 4, 2014, discloses an overhead mobile charger system for mounting between a pair of adjacent and spaced-apart rows of side-by-side parking spaces and exhibiting full circle traversing so as to reach and charge electric vehicles parked in the pair of adjacent and spaced-apart rows of side-by-side parking spaces. The system includes a single EV battery charger, a boom, and apparatus for rotatably mounting the boom over, and between, the pair of adjacent and spaced-apart rows of side-by-side parking spaces. The single EV battery charger has a power cable terminating in an EV connector. The power cable of the single EV battery charger runs along, and depends from, the boom, and together with the boom being rotatably mounted via the apparatus so as to allow the boom to exhibit full circle traversing, the electric vehicles parked in the pair of adjacent and spaced-apart rows of side-by-side parking spaces are reached and charged by the EV connector of the single EV battery charger.

U.S. Pat. No. 10,828,770 for Power delivery system for electric vehicle charging station by inventors Zhao et al, filed Aug. 24, 2017 and issued Nov. 10, 2020, discloses a vehicle charging station including a track configured to extend across a plurality of vehicle parking spaces. The charging station further includes a movable charging apparatus supported by the track and translatable along the track between the plurality of vehicle parking spaces. The charging station further includes a first contact wire extending approximately parallel to the track. The charging station further includes a first conductor pole configured to couple the movable charging apparatus to the first contact wire at a plurality of locations along a width of the first contact wire. The first conductor pole is configured to move with the movable charging apparatus. In such a manner, a one-to-many charging station can be accomplished.

U.S. Patent Pub. No. 2017/0267114 for Shuttle System for Overhead EVSE by inventors Bianco et al, filed Jun. 5, 2017 and published Sep. 21, 2017, discloses a shuttle system employing an overhead track for selectively positioning an overhead EVSE for servicing one of multiple bays of a service facility. The EVSE is mounted to rails of the track system by tandem roller assemblies. The power cord which connects the EVSE to the power supply is coilable by roller assemblies which also slide on a rail and allow the EVSE to be connected to power regardless of the position along the rail.

U.S. Pat. No. 10,227,016 for Ceiling mounted charging station and parking structure for charging electric vehicles by inventor Sychov, filed Jun. 26, 2015 and issued Mar. 12, 2019, discloses a ceiling mounted charging station for charging the battery of an electric vehicle parking on a parking space. The charging station comprises a charging arm for connection with the electric vehicle. The first end of the charging arm is mounted to a housing of the charging station. A charging interface for connection with a corresponding charging socket of the electric vehicle is located at a second end of the charging arm opposite to the first end. The charging arm is rotatable with respect to the housing between a stored-position and a use-position. The distance of the second end of the charging arm to the ground of the parking space is smaller in the use-position as in the store-position. The invention furthermore relates to a parking structure comprising a multiplicity of parking spaces for vehicles and at least one charging station mounted to the ceiling of the parking structure. The inventive charging station and the inventive parking structure provide the possibility of an easy charging of electric vehicles, wherein installation costs are low.

U.S. Pat. No. 11,318,857 for System for hands-free electrified vehicle charging by inventors Westfall et al., filed Nov. 1, 2019 and issued May 3, 2022, discloses a vehicle charging station including a shroud configured to guide a vehicle charge plug that is lowered from a vehicle toward a charge connector as the vehicle moves toward the charging station. The vehicle charge plug and the charge connector have contacts arranged on a connector face that is generally perpendicular to a surface on which the vehicle charging station rests.

U.S. Pat. No. 10,099,566 for Hands free vehicle charging system by inventors Wu et al., filed Oct. 10, 2014 and issued Oct. 16, 2018, discloses a drive system mounted to a chassis, a positionable electrical connector assembly, a position sensor, a proximity sensor, and a control module. The control module may be programmed to operate the drive system to place the chassis proximate a vehicle electrical connector and operate the positionable electrical connector assembly to releasably engage the vehicle electrical connector.

U.S. Patent Pub. No. 2022/0024328 for Robotic electromagnetic electric vehicle charging system by inventor Cameron, filed Jul. 26, 2021 and published Jan. 27, 2022, discloses a system, method, and apparatus for wirelessly charging a load. A primary transformer coil from an energy source is provided to interface with a load application with a secondary transformer coil. The method of charging is independent of resonance frequency.

U.S. Pat. No. 9,868,421 for Robot assisted modular battery interchanging system by inventor Hassounah, filed Jun. 17, 2016 and issued Jan. 16, 2018, discloses systems and apparatus for a robotic charging station for charging a battery of an electric vehicle. A semi-autonomous portable robot is programmed to interchange depleted rechargeable batteries disposed in an electric or hybrid vehicle. Portable battery pod dispenses batteries to semi-autonomous portable robot for swap. Semi-autonomous portable robot uses navigational sensors to transport battery to predetermined position at the battery interchange location. Battery disposition and configuration data are wirelessly communicated by battery pod to semi-autonomous portable robot. Battery pod is also in electrical communication with vehicle for timely latching and unlatching of battery modules.

U.S. Pat. No. 10,532,663 for Electric vehicle overhead charging system and method of use by inventor Ricci, filed Feb. 16, 2016 and issued Jan. 14, 2020, discloses techniques for electric vehicle systems, and in particular to an electric vehicle emergency charging system and method of use. In one embodiment, a system for charging a moving electric vehicle is provided, the system comprising: an electrical storage unit disposed on the electric vehicle; a charging panel in electrical communication with the electrical storage unit; a vehicle controller that determines if the electrical storage unit requires charging and configured to determine if an overhead power source is available to charge the electrical storage unit; wherein the charging panel receives the charge from the overhead power source and charges the electrical storage unit.

U.S. Pat. No. 11,312,257 for Robot with vehicle charging by inventors Lee et al., filed Jul. 17, 2019 and issued Apr. 26, 2022, discloses a processor-implemented robot control method including: determining a target position from map information; estimating a candidate region for a current position in the map information based on information sensed by an inertial measurement unit (IMU) and first image information received from an image sensor; estimating the current position in the candidate region based on second image information received from either the image sensor or another image sensor; and controlling a movement of a vehicle charging robot based on the target position and the current position.

Chinese Patent No. 111976515 for Hanger rail type system for charging electric automobile, filed Aug. 28, 2020 and issued Aug. 26, 2022, discloses a hanging rail type system for charging an electric automobile, which comprises an annular rail, a 'king' shaped movable sliding rail, a sliding mechanism, a transmission mechanism, a winding mechanism and a charging mechanism; wherein, "king" font removes slide rail and includes moving mechanism and climbing mechanism, sliding mechanism are including pulley, loose axle and second slider, transmission device are including brush, connector, power transmission line and wiping line. The system can realize the movement of the charging mechanism according to the parking position of a user, effectively reduces the occupied area of a field of the charging pile, does not need to strictly divide the parking area, has the characteristics of being movable and automatically controlling the position of the charging gun according to the requirement of the user, is convenient for the user to use, and does not need the characteristics of waiting for the charging position of the user.

SUMMARY OF THE INVENTION

The present invention relates to electric vehicle charging stations, and more specifically to electric vehicle charging stations with automatic movement of charging vehicles and integrated entertainment and food services systems.

It is an object of this invention to provide a structure for charging an electric vehicle while providing entertainment for a driver and providing an indication of queue for using the structure.

In one embodiment, the present invention is directed to a system for charging a moving electric vehicle, including an enclosure, including side walls and a roof, at least one automatic vehicle movement system, at least one entertainment display screen, and at least one electric vehicle (EV) charge connector, wherein the at least one automatic vehicle movement system is configured to receive at least one vehicle and automatically move the at least one vehicle from a first end of the enclosure to a second end of the enclosure, wherein the at least one entertainment display screen is mounted on an entertainment chassis, wherein the entertainment chassis is configured to move with the at least one vehicle along a first rail, wherein the at least one EV charge connector is mounted on a charging chassis, and wherein the charging chassis is configured to move with the at least one vehicle along a second rail.

In another embodiment, the present invention is directed to a system for charging a moving electric vehicle, including an enclosure, including side walls and a roof, at least one automatic vehicle movement system, at least one electric vehicle (EV) charge connector, and a central operating processor configured to automatically adjust a position, a path, and/or a height of the at least one EV charge connector, wherein the at least one automatic vehicle movement system is configured to receive at least one vehicle and automatically move the at least one vehicle from a first end of the enclosure to a second end of the enclosure, wherein the at least one EV charge connector is mounted on a charging chassis, wherein the charging chassis is configured to move with the at least one vehicle, and wherein the central operating processor is operable to receive signals from at least one user device indicating a vehicle model or a type of vehicle entering the enclosure, and wherein the central operating processor automatically adjusts the heights and/or positions of the at least one EV charge connector based on the vehicle model or the type of vehicle.

In yet another embodiment, the present invention is directed to a system for charging a moving electric vehicle, including an enclosure, including side walls and a roof, at least one automatic vehicle movement system, at least one electric vehicle (EV) charge connector, and a central operating processor, wherein the at least one automatic vehicle movement system is configured to receive at least one vehicle and automatically move the at least one vehicle from a first end of the enclosure to a second end of the enclosure, wherein the at least one EV charge connector is mounted on a charging chassis, wherein the charging chassis is configured to move with the at least one vehicle, and wherein the central operating processor is operable to transmit occupancy data to a central server, wherein the occupancy data includes a number of vehicles currently being charged by the system, a number of vehicles waiting to be charged by the system, a length of time that one or more vehicles has been charging within the system, and/or an estimated amount of time before the system is able to accept a new vehicle.

These and other aspects of the present invention will become apparent to those skilled in the art after a reading of the following description of the preferred embodiment when considered with the drawings, as they support the claimed invention.

DETAILED DESCRIPTION

Figure 1:
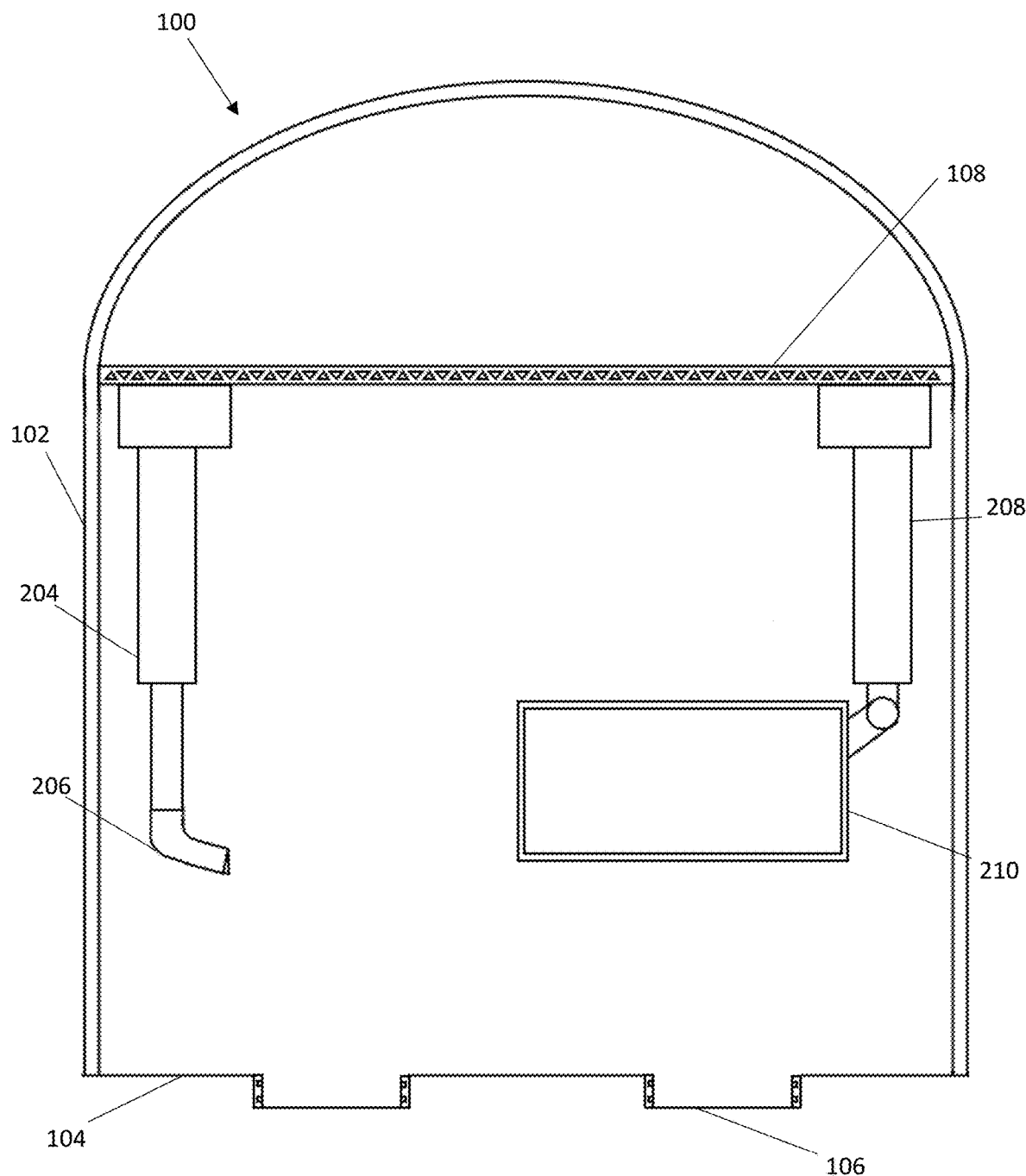
FIG. 1 illustrates a front orthogonal view of an electric vehicle charging structure including overhead charging and entertainment mechanisms according to one embodiment of the present invention.

The present invention is generally directed to electric vehicle charging stations, and more specifically to electric vehicle charging stations with automatic movement of charging vehicles and integrated entertainment and food services systems.

In one embodiment, the present invention is directed to a system for charging a moving electric vehicle, including an enclosure, including side walls and a roof, at least one automatic vehicle movement system, at least one entertainment display screen, and at least one electric vehicle (EV) charge connector, wherein the at least one automatic vehicle movement system is configured to receive at least one vehicle and automatically move the at least one vehicle from a first end of the enclosure to a second end of the enclosure, wherein the at least one entertainment display screen is mounted on an entertainment chassis, wherein the entertainment chassis is configured to move with the at least one vehicle along a first rail, wherein the at least one EV charge connector is mounted on a charging chassis, and wherein the charging chassis is configured to move with the at least one vehicle along a second rail.

In another embodiment, the present invention is directed to a system for charging a moving electric vehicle, including an enclosure, including side walls and a roof, at least one automatic vehicle movement system, at least one electric vehicle (EV) charge connector, and a central operating processor configured to automatically adjust a position, a path, and/or a height of the at least one EV charge connector, wherein the at least one automatic vehicle movement system is configured to receive at least one vehicle and automatically move the at least one vehicle from a first end of the enclosure to a second end of the enclosure, wherein the at least one EV charge connector is mounted on a charging chassis, wherein the charging chassis is configured to move with the at least one vehicle, and wherein the central operating processor is operable to receive signals from at least one user device indicating a vehicle model or a type of vehicle entering the enclosure, and wherein the central operating processor automatically adjusts the heights and/or positions of the at least one EV charge connector based on the vehicle model or the type of vehicle.

In yet another embodiment, the present invention is directed to a system for charging a moving electric vehicle, including an enclosure, including side walls and a roof, at least one automatic vehicle movement system, at least one electric vehicle (EV) charge connector, and a central operating processor, wherein the at least one automatic vehicle movement system is configured to receive at least one vehicle and automatically move the at least one vehicle from a first end of the enclosure to a second end of the enclosure, wherein the at least one EV charge connector is mounted on a charging chassis, wherein the charging chassis is configured to move with the at least one vehicle, and wherein the central operating processor is operable to transmit occupancy data to a central server, wherein the occupancy data includes a number of vehicles currently being charged by the system, a number of vehicles waiting to be charged by the system, a length of time that one or more vehicles has been charging within the system, and/or an estimated amount of time before the system is able to accept a new vehicle.

Electric vehicle ownership is rising, as concerns over global warming and energy scarcity weigh more heavily on the public consciousness. Between 2011 and 2021, electric vehicle (EV) ownership increased from 0.2% of car sales in the US to 4.6%, with the trend showing strong signs of continuing. However, electric vehicles face several obstacles including the prospect of longer distance travel. While electric vehicles are typically able to be charged by their owners overnight, the maximum range of modern electric vehicles mean they often need to be charged mid-trip, especially for long distance travel. This is an issue, as, unlike gas refueling, which only requires about 5 minutes of a driver's time, fully recharging an EV takes at least 15 minutes, if not much longer.

While companies are working to decrease the total charge time and expand the grid of EV chargers across the US and abroad, solutions are needed for current vehicles to make charging a less onerous experience and therefore potentially increase comfort and reliability of EV ownership. Current solutions do not focus on keeping a user entertained or distracted during the charging process, instead focusing more heavily on logistics of how the charging plug is attached to the EV. For example, U.S. Pat. No. 8,643,329 assumes that vehicles are parked within a specific area and utilizes a charging system that is able to pivot to attach to any vehicle within the area. Alternatively, patents such as U.S. Pat. No. 11,312,257 focus on bringing a vehicle charging robot to one or more parking places for delivering power. However, neither of these solutions address the fundamental issue of the boredom, monotony, and inconvenience of charging, instead merely focusing on the convenience of attaching charging station and vehicle.

None of the prior art presents a solution for making EV charging more convenient by combining the charging with other processes, such as car washing or ordering food, which are tasks that generally would cost an additional stop, but which are able to be combined with charging to increase convenience. Furthermore, none of the prior art includes an integrated entertainment means to keep a driver distracted and amused while the charging process is happening in order to kill time.

Another issue currently is the number of charging stations and the difficulty for drivers to recognize whether all charging stations are currently occupied and for how long such charging stations will be occupied when the drivers approach a charging facility. This issue is relatively unique to EV charging, as gas refueling is so quick that the maximum amount of time that one needs to wait for another vehicle is always short, and not, for example, 30 minutes to an hour. One proposal is to simply increase the number of charging stations, but this solution raises issues of practicality, especially as the number of EVs exponentially increases. Furthermore, simply adding more charging stations fails to address the issue of drivers knowing much longer charging stations will be occupied if all stations are filled. Therefore, a solution is needed that generates a queue of vehicles for charging such that an individual is able to gauge amount of time before an available spot by checking the length of the queue.

Referring now to the drawings in general, the illustrations are for the purpose of describing one or more preferred embodiments of the invention and are not intended to limit the invention thereto.

FIG. 1 illustrates a front orthogonal view of an electric vehicle charging structure including overhead charging and entertainment mechanisms according to one embodiment of the present invention. An electric vehicle (EV) charging enclosure 100 includes side walls 102 connected by a roof. The front and rear of the EV charging enclosure 100 are open, providing a central passage through which an electric vehicle is able to enter and exit. In one embodiment, the floor 104 of the EV charging enclosure 100 is a component connecting the side walls 102 of the enclosure 100. In another embodiment, the floor 104 is simply the ground beneath the enclosure 100 over which the enclosure is placed and is not directly connected to the side walls 102. In one embodiment, the side walls 102 are secured to the floor 104 via any traditional attachment means (e.g., nails, stakes, screws, etc.). In another embodiment, the side walls 102 are not attached to the floor 104, but are weighted with one or more weights such that the enclosure 100 is not easily movable by environmental factors (e.g., wind). In one embodiment, as depicted in FIG. 1, the side walls 102 are substantially parallel, and the roof is a curved structure. However, one of ordinary skill in the art will understand that the cross-sectional shape of the enclosure 100 is not intended to be limiting and the enclosure 100 is able to take any shape, including ones in which the side walls 102 are not substantially parallel or in which the roof is not curved.

In one embodiment, the floor 104 includes wheel depressions 106 configured to left-side and right-side tires of incoming electric vehicles. In one embodiment, the wheel depressions 106 are sized large enough to accommodate thick wheels as less as thinner wheels. The wheel depressions 106 form a part of an automatic vehicle moving system within the enclosure 100 that allows the vehicle to be moved by the present system from a first, opening end of the enclosure 100 to a second, exit end of the enclosure 100 autonomously, without operation of the vehicle. Automatically moving the vehicle through the enclosure has several advantages, providing automatic services without requiring the driver to do anything and also providing a natural, visible queue for the enclosure 100. For example, drivers browsing for a charging station will be able to look and see that the enclosure is occupied, potentially including one or more cars in line, or is free and available for use. Furthermore, the position of the vehicle with respect to the length of the enclosure provides an indication of the remaining time of the vehicle within the enclosure (i.e., if the vehicle is 80% of the way through the enclosure, then a driver is able to determine that the vehicle only has a few minutes left of charging).

In one embodiment, the enclosure 100 includes at least one overhead rail 108. One or more components are configured to slide along the length of the enclosure 100 along the at least one overhead rail 108 providing for mobility of the one or more components. In one embodiment, the one or more components include at least one EV charge connector chassis 204. The at least one EV charge connector chassis 204 includes at least one EV charge connector 206 connected to at least one extendable robotic arm. In one embodiment, the at least one extendable robotic arm is operable to adjust its length, thereby adjusting the height of the at least one EV charge connector 206. Adjusting the height of the at least one EV charge connector 206 is useful in allowing the system to connect to different sized EVs and allows the enclosure to cater to any, or at least a large percentage of, EV owners wishing to use the enclosure 100. Furthermore, because the at least one EV charge connector chassis 204 is able to slide along the at least one overhead rail 108, the at least one EV charge connector 206 is able to move along with the vehicle, while the vehicle is moved by the automatic vehicle moving system. In one embodiment, the at least one EV charge connector 206 includes an integrated meter configured to automatically detect an amount of charge on the EV and/or an amount of charge remaining until the EV battery is full. In one embodiment, the system includes different EV charge connectors 206 of different wattage, voltage, or current ratings for charging different types of vehicles (i.e., if vehicles are only able to receive a specific maximum wattage), or for charging different vehicles based on amount paid for using the charging enclosure (e.g., higher pay for faster charging speed). Examples of charger wattages compatible with the present invention include, but are not limited to, 1 kW, 2 kW, 3 kW, 20 kW, 72 kW, 150 kW, 250 kW, 360 kW, and/or any other wattage values.

In one embodiment, the EV charge connector 206 is attached to a flexible hose connected to the at least one EV charge connector chassis 204. In one embodiment, the EV charge connector 206 does not automatically attach to the charge port of the at least one vehicle and is instead guided into the port manually. Different charging heads are operable to be attached to the EV charge connector 206 based on different ports on a variety of vehicles. In one embodiment, the appropriate charging head is selected by an attendant. Alternatively, a robot utilizes computer vision or any other method of identifying charging port, such as determining the make and model of a vehicle and determining a charging port type of the make and model of the vehicle. After being attached, the EV charge connector chassis 204 is able to move along with the vehicle for the duration of charging. While this embodiment is not fully automated, it does allow for the system to attach and move with the vehicle without requiring potentially complex sensors to determine the vehicle light and the port position, as the hose is sufficiently flexible as to adjust to different heights and positions along the vehicle. In one embodiment, each of the robots are attached to one or more power sources continually feeding power from a main electric power grid or a microgrid to the robots, such that they are able to provide power to the electric vehicle. In another embodiment, each of the robots include a rechargeable battery power unit, able to be replaced at regular intervals or as needed to supply power to electric vehicles.

In one embodiment, the one or more components configured to side along the at least one overhead rail 108 includes at least one entertainment display chassis 208. The at least one entertainment display chassis 208 includes at least one display screen 210 connected to at least one extendable robotic arm. In one embodiment, the at least one extendable robotic arm is operable to adjust its length, thereby adjusting the height of the at least one display screen 210. In one embodiment, the at least one extendable robotic arm is operable to adjust the angle at which the at least one display screen 210 is connected to the at least one extendable robotic arm. Adjusting the height and/or angle of the at least one display screen 210 also allows the system to cater to EVs of different sizes, as otherwise the at least one display screen 210 would be fixed at a position too high for smaller cars or so low that it could obstruct larger vehicles.

In an alternative embodiment, the enclosure 100 does not include at least one entertainment display chassis 208, but instead includes a plurality of display screens connected to and extending inwardly from an interior surface of a side wall 102 of the enclosure 100, or from a structural element with the enclosure 100. In this way, a driver is still able to view media as the car moves through the enclosure across the different screens, even if individual screens are not always visible or easily visible to the driver.

In one embodiment, the at least one overhead rail 108 includes two separate rails, one positioned to the left of incoming vehicles and one positioned to the right of incoming vehicles. In one embodiment, in the system with two rails, both rails include at least one entertainment display chassis 208 and at least one EV charge connector chassis 204, thereby allowing the system to charge EVs having charging ports on either side of the vehicle, while showing entertainment media content on a display screen on the opposite rail relative to the rail holding the EV charging connector chassis 204. Alternatively, each of the two separate rails only includes either the at least one EV charge connector chassis 204 or the at least one entertainment display chassis 208, meaning this embodiment of the enclosure 100 is only able to charge vehicles having a port on one side of the vehicle, or meaning that vehicles having a charging port on the opposite side must back up into the enclosure to face the other way. One of ordinary skill in the art will note that it is possible to eliminate the at least one entertainment display chassis and only include one or more EV charging connector chasses, but a preferred embodiment includes both components.

Figure 3:
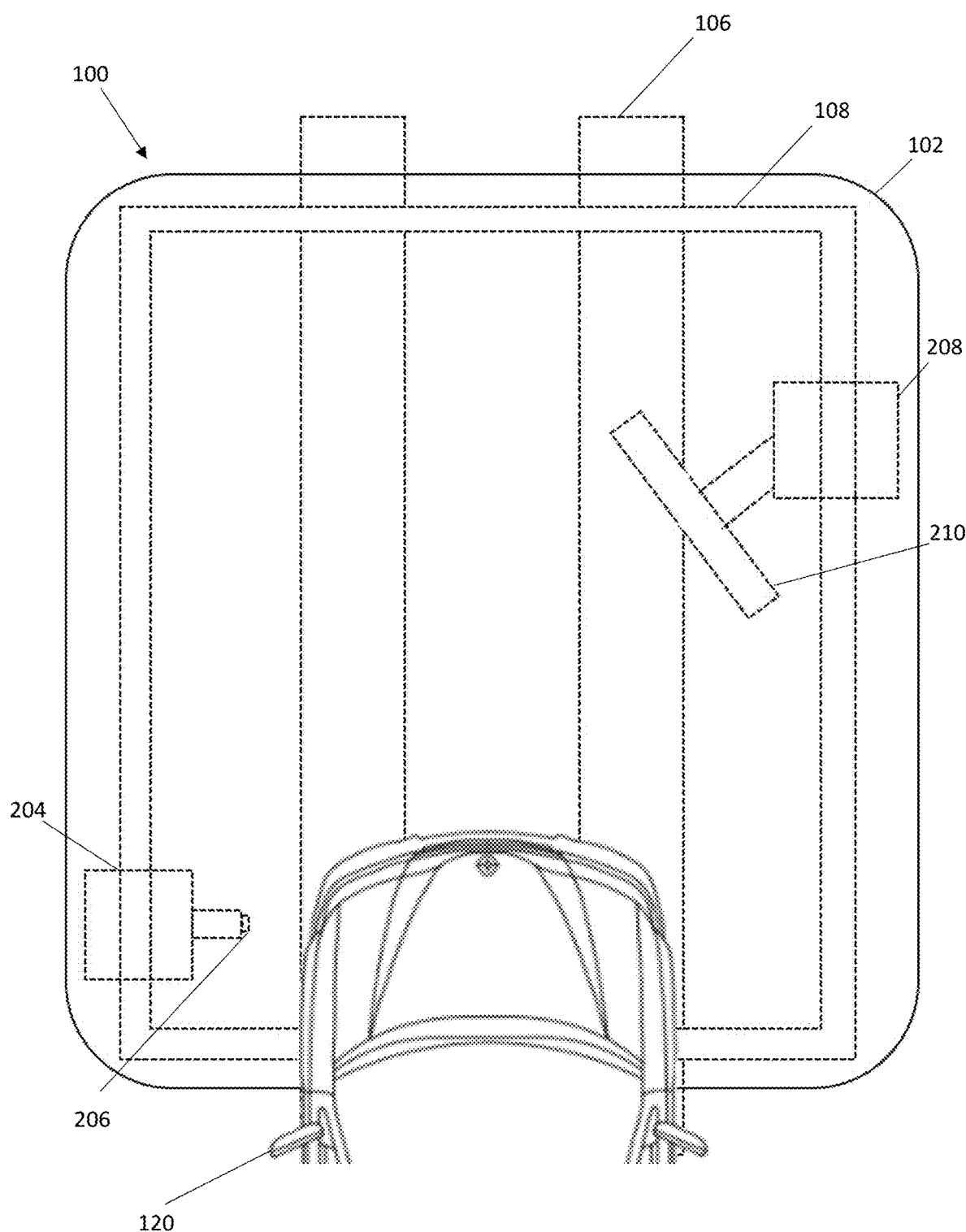
FIG. 3 illustrates a top orthogonal view of an electric vehicle charging structure including overhead charging and entertainment mechanisms according to one embodiment of the present invention.

In another embodiment, the at least one overhead rail 108 includes only a single rail (as is depicted in FIG. 3). In this embodiment, the single rail forms a closed loop with portions located to the left of incoming vehicles and portions located to the right of incoming vehicles. A single overhead rail allows for the at least one EV charge connector chassis 204 and the at least one entertainment display chassis 208 to swap places, rather than requiring two of each chassis in order to cover both sides of incoming vehicles. In one embodiment, the single rail includes portions approximately parallel to the length of the enclosure 100 positioned to the left and to the right of incoming vehicles. Generally, chasses stay on these parallel portions, unless they are actively swapping sides, in which case they necessarily must traverse sections connecting the parallel sections of the single rail.

Figure 2:
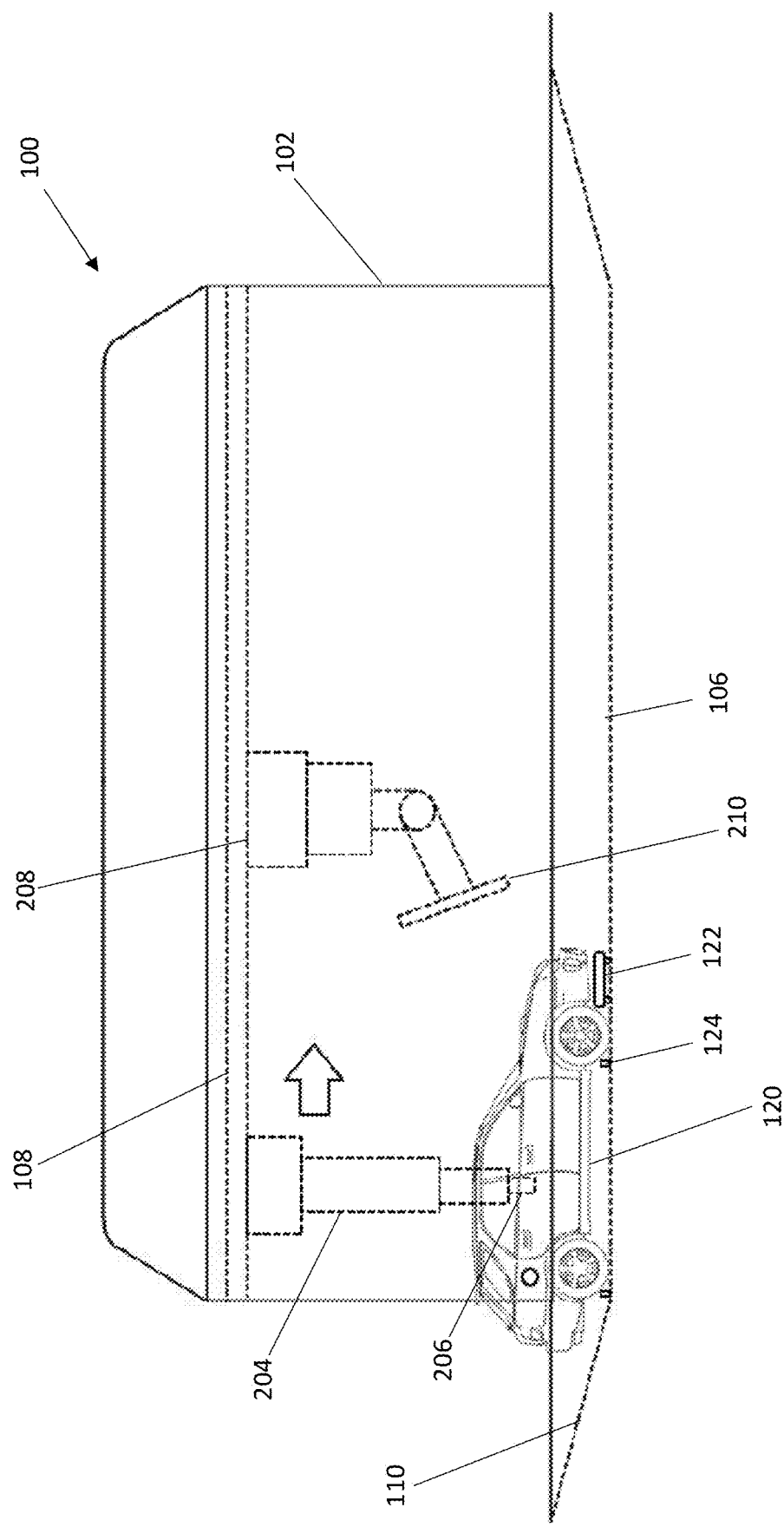
FIG. 2 illustrates a side orthogonal view of an electric vehicle charging structure including overhead charging and entertainment mechanisms according to one embodiment of the present invention.

FIG. 2 illustrates a side orthogonal view of an electric vehicle charging structure including overhead charging and entertainment mechanisms according to one embodiment of the present invention. In one embodiment, the wheel depressions 106 for receiving an incoming vehicle 120 include a ramp section 110, including a shallow slope for easing the incoming vehicle 120 into the wheel depressions 106 (rather than providing a sudden jolt). In one embodiment, the wheel depressions 106 include a belt-like mechanism for moving the vehicle 120 along through the enclosure 100. In one embodiment, the belt-like mechanism includes notch projections 124 behind one or more wheels of the vehicle 120, helping to prevent the wheels from slipping while the vehicle 120 is being moved. In one embodiment, the belt-like mechanism includes at least one front stopper 122 configured to move just in front of the vehicle 120, also helping the vehicle from inadvertently rolling during transport.

As shown in FIGS. 2 and 3, preferably, the at least one entertainment display chassis 208 moves ahead of the at least one EV charging connector chassis 204, lengthwise, as the at least one EV charging connector 206 must connect to a port on the vehicle 120, while the display screen 210 generally must be in front of the vehicle 120 in order to be adequately seen.

One of ordinary skill in the art will understand that the wheel depressions 106 are able to be but need not be actual depressions below the floor 104 of the enclosure 100. For example, in another embodiment, a bottom surface of the wheel depressions 106 is approximately even with the floor 104 of the enclosure 100. In this embodiment, the wheel depressions 106 preferably include guardrails on each side of each wheel depression 106 to prevent lateral movement of the wheels of the vehicle 120.

In one embodiment, the enclosure includes a central processer operable to receive data from one or more external devices, process the data, and transmits data to one or more external devices. In one embodiment, the central processor is able to communicate over a wireless local area network (WLAN, e.g., WI-FI) and/or a wireless personal area network (WPAN, e.g., BLUETOOTH). In one embodiment, the central processor is configured to receive information regarding the make, model, and/or type (e.g., SUV, Sedan, Van, etc.) of a vehicle entering the enclosure 100 from at least one user device. In one embodiment, the information is received via at least one app interface corresponding to the enclosure. The central processor is able to cross-reference the received type, make, or model of the vehicle with known information regarding the type, make or model of the vehicle. In one embodiment, the central processor communicates with a central server for information regarding the received type, make, or model of the incoming vehicle. In another embodiment, the enclosure includes at least one visual sensor (e.g., at least one camera, at least one LiDAR sensor, etc.). The at least one visual sensor is positioned externally on the enclosure 100 such that it is able to see vehicles entering the enclosure 100. In one embodiment, the at least one visual sensor is operable to automatically identify a make, model, or type of vehicle based on generated image data. In another embodiment, the at least one visual sensor does not recognize a specific make, model, or even type of vehicle, but rather identifies one or more key features of the vehicle 120, including, but not limited to, a length of the vehicle, a height of the vehicle, a side on which a charge port is located, a relative position along the length of the vehicle where the charge port is located, a height of the windshield, and/or other properties of the vehicle.

In one embodiment, based on the received or sensor-detected make, model, or type of the vehicle 120, the system automatically adjusts the positions and/or heights of the at least one EV charge connector chassis 204 and/or the at least one entertainment display chassis 208. For example, if the first car that enters is an SUV, then the height of the at least one EV charge connector chassis 204 must be increased relative to the position used for a sedan. In another example, based on the received make, model, or type of the vehicle 120, the at least one EV charge connector chassis 204, previously positioned on the left side of incoming vehicles, is automatically moved to the right side of the vehicle 120 to accommodate a right-side charging port, which is known to exist on the received, make, model, or type of the vehicle 120.

Figure 4:
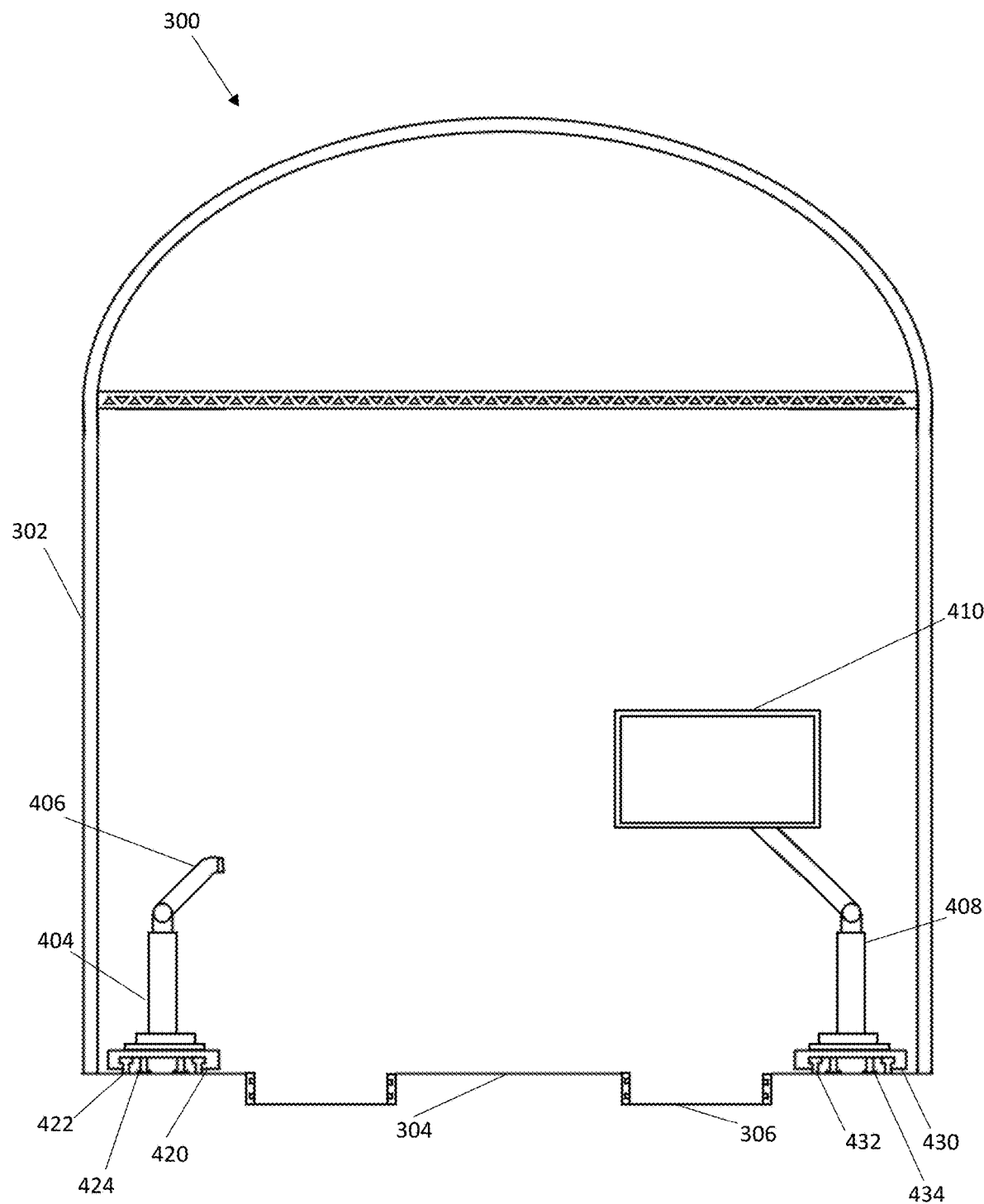
FIG. 4 illustrates a front orthogonal view of an electric vehicle charging structure including on-rail charging and entertainment mechanisms according to one embodiment of the present invention.

FIG. 4 illustrates a front orthogonal view of an electric vehicle charging structure including on-rail charging and entertainment mechanisms according to one embodiment of the present invention. An electric vehicle (EV) charging enclosure 300 includes side walls 302 connected by a roof. The front and rear of the EV charging enclosure 300 are open, providing a central passage through which an electric vehicle is able to enter and exit. In one embodiment, the floor 304 of the EV charging enclosure 300 is a component connecting the side walls 302 of the enclosure 300. In another embodiment, the floor 304 is simply the ground beneath the enclosure 300 over which the enclosure is placed and is not directly connected to the side walls 302. In one embodiment, the side walls 302 are secured to the floor 304 via any traditional attachment means (e.g., nails, stakes, screws, etc.). In another embodiment, the side walls 302 are not attached to the floor 304, but are weighted with one or more weights such that the enclosure 300 is not easily movable by environmental factors (e.g., wind). In one embodiment, as depicted in FIG. 1, the side walls 302 are substantially parallel, and the roof is a curved structure. However, one of ordinary skill in the art will understand that the cross-sectional shape of the enclosure 300 is not intended to be limiting and the enclosure 300 is able to take any shape, including ones in which the side walls 302 are not substantially parallel or in which the roof is not curved.

In one embodiment, the floor 304 includes wheel depressions 306 configured to left-side and right-side tires of incoming electric vehicles. In one embodiment, the wheel depressions 306 are sized large enough to accommodate thick wheels as less as thinner wheels. The wheel depressions 306 form a part of an automatic vehicle moving system within the enclosure 300 that allows the vehicle to be moved by the present system from a first, opening end of the enclosure 300 to a second, exit end of the enclosure 300 autonomously, without operation of the vehicle.

In one embodiment, a first side rail 422 is positioned to the left of the wheel depressions 306 and a second side rail 432 is positioned to the right of the wheel depressions 306. In one embodiment, the first side rail 422 and/or the second side rail 432 are both substantially parallel to the wheel depressions 306. In one embodiment, at least one EV charging connector chassis 420 grips the exterior of the first side rail 422 and is operable to freely slide along the first side rail 422. In one embodiment, the at least one EV charge connector chassis 420 includes one or more wheels 424, such that when at least one EV charge connector chassis 420 is attached to the first side rail 422, the wheels 424 are positioned between two sides of the first side rail 422. The wheels 424 help facilitate movement of the at least one EV charge connector chassis 420 along the first side rail 422. Because the at least one EV charging connector chassis 420 is able to move along the first side rail 422, it is able to move along with and continue charging a vehicle being moved through the enclosure 300.

The EV charge connector chassis 420 is connected to at least one extendable robotic arm 404. In one embodiment, attached at the end of the at least one extendable robotic arm 404 is at least one EV charge connector 406 operable to interface within and connected directly with at least one charge port of an EV. The at least one extendable robotic arm 404 is able to alter the height of the at least one EV charge connector 406, allowing the EV charge connector 406 to connect with vehicles of different heights and sizes.

In one embodiment, at least one entertainment display chassis 430 grips the exterior of the second side rail 432 and is operable to freely slide along the second side rail 432. In one embodiment, the at least one entertainment display chassis 430 includes one or more wheels 434, such that when at least one entertainment display chassis 430 is attached to the second side rail 432, the wheels 434 are positioned between two sides of the second side rail 432. The wheels 434 help facilitate movement of the at least one entertainment display chassis 430 along the second side rail 432.

The entertainment display chassis 430 is connected to at least one extendable robotic arm 408. In one embodiment, attached at the end of the at least one extendable robotic arm 408 is at least one display screen 410 operable to display media content to a driver. The at least one extendable robotic arm 408 is able to alter the height of display screen 410, allowing the entertainment display 410 to show content to vehicles of different sizes.

One of ordinary skill in the art will understand that the at least one EV charge connector chassis 420 and the entertainment display chassis 430 are interchangeably able to be placed on the first side rail 422 and/or the second side rail 432. Therefore, the system is not limited to positioning the at least one EV charge connector chassis 420, for example, on the left side of incoming vehicles.

Figure 5:
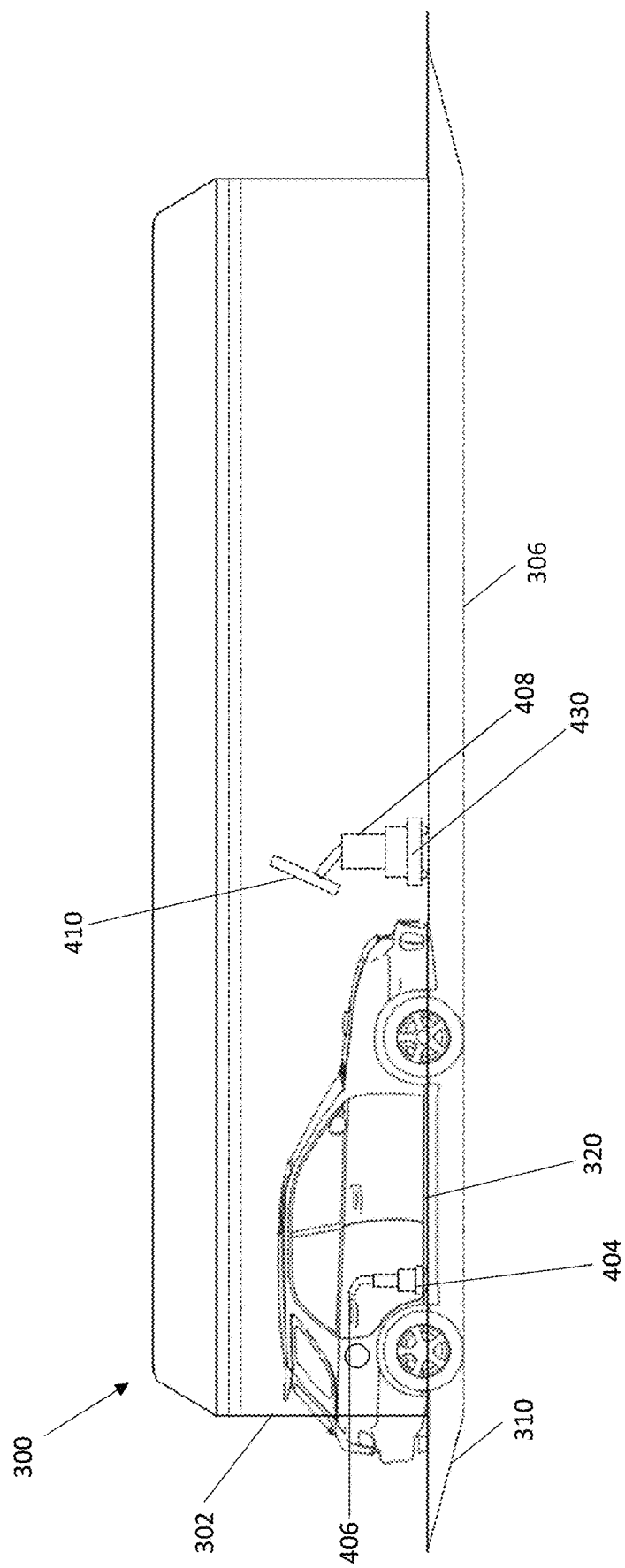
FIG. 5 illustrates a side orthogonal view of an electric vehicle charging structure including on-rail charging and entertainment mechanisms according to one embodiment of the present invention.

FIG. 5 illustrates a side orthogonal view of an electric vehicle charging structure including on-rail charging and entertainment mechanisms according to one embodiment of the present invention. In one embodiment, the wheel depressions 306 for receiving an incoming vehicle 320 include a ramp section 310, including a shallow slope for easing the incoming vehicle 320 into the wheel depressions 306 (rather than providing a sudden jolt). In one embodiment, the wheel depressions 306 include a belt-like mechanism for moving the vehicle 320 along through the enclosure 300.

Figure 6:
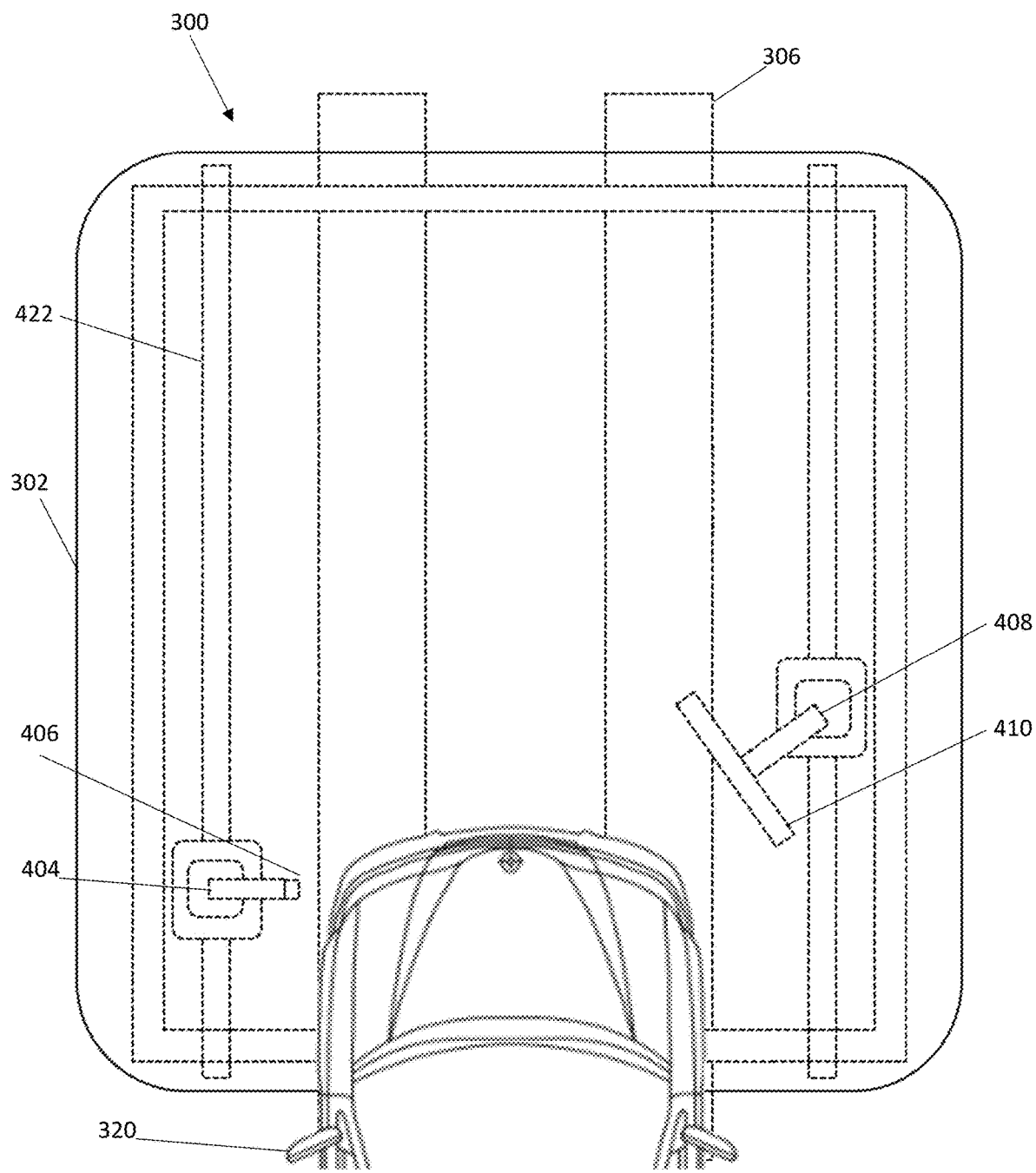
FIG. 6 illustrates a top orthogonal view of an electric vehicle charging structure including on-rail charging and entertainment mechanisms according to one embodiment of the present invention.

As shown in FIGS. 5 and 6, preferably, the at least one entertainment display chassis 430 moves ahead of the at least one EV charging connector chassis, lengthwise, as the at least one EV charging connector 406 must connect to a port on the vehicle 320, while the display screen 410 generally must be in front of the vehicle 320 in order to be adequately seen.

One of ordinary skill in the art will understand that the wheel depressions 306 are able to be, but need not be, actual depressions below the floor 304 of the enclosure 300. For example, in another embodiment, a bottom surface of the wheel depressions 306 is approximately even with the floor 304 of the enclosure 300. In this embodiment, the wheel depressions 306 preferably include guardrails on each side of each wheel depression 306 to prevent lateral movement of the wheels of the vehicle 320.

In another embodiment, one or more moving robots including entertainment displays and/or charging connectors are operable to automatically move along with a vehicle as it moves through an EV charging enclosure. In this embodiment, the one or more moving robots are not attached to set tracks and are freely movable. In one embodiment, the robots are rectangular prism or rounded rectangular prism assemblies. In one embodiment, the one or more moving robots move via one or more wheels articulating with the ground and are not fixed on a rail, and therefore have freedom of movement in two or three dimensions. In one embodiment, the one or more wheels are omnidirectional wheels, such as those disclosed in U.S. Pat. Nos. 10,675,912, 10,369,839, and 10,071,596, each of which is incorporated herein by reference in its entirety. Omnidirectional wheels allow each robot to move laterally with the vehicle while maintaining the position of whatever object the robot is holding, regardless of the orientation of the robot. In one embodiment, the one or more moving robots include at least one computer vision system, wherein the one or more moving robots are operable to automatically determine a location of a charge port on the vehicle based on the computer vision system and the one or more moving robots are automatically positioned in accordance with the determined location of the charge port on the vehicle. Furthermore, in one embodiment, the computer vision system is operable to automatically detect a position of a front of a vehicle and/or a height of the vehicle such that a robot including a display screen is able to automatically reposition in front of the vehicle and lift the display screen to an appropriate height for viewing by the driver. In another embodiment sensors on the robot and/or within the enclosure guide the robot so as to not impact vehicles or become stuck in the path of a vehicle. In another embodiment, the robots use geofencing technology or another geolocation technology to determine their position and the position of charging ports and/or vehicles, with each robot and vehicle and/or charging port having a specific address in a geofence. In one embodiment, geofencing and rule spaces for the robots and vehicles are implemented as described in U.S. Pat. No. 10,979,849, which is incorporated herein by reference in its entirety.

Charging enclosures according to any embodiment of the present invention are able to receive a plurality of vehicles simultaneously, either side by side in separate "tracks" or conveyors, or sequentially within the same track or conveyor, depending on the length of the enclosure. Therefore, the present invention further provides for means of mass charging electric vehicles.

Figure 7:
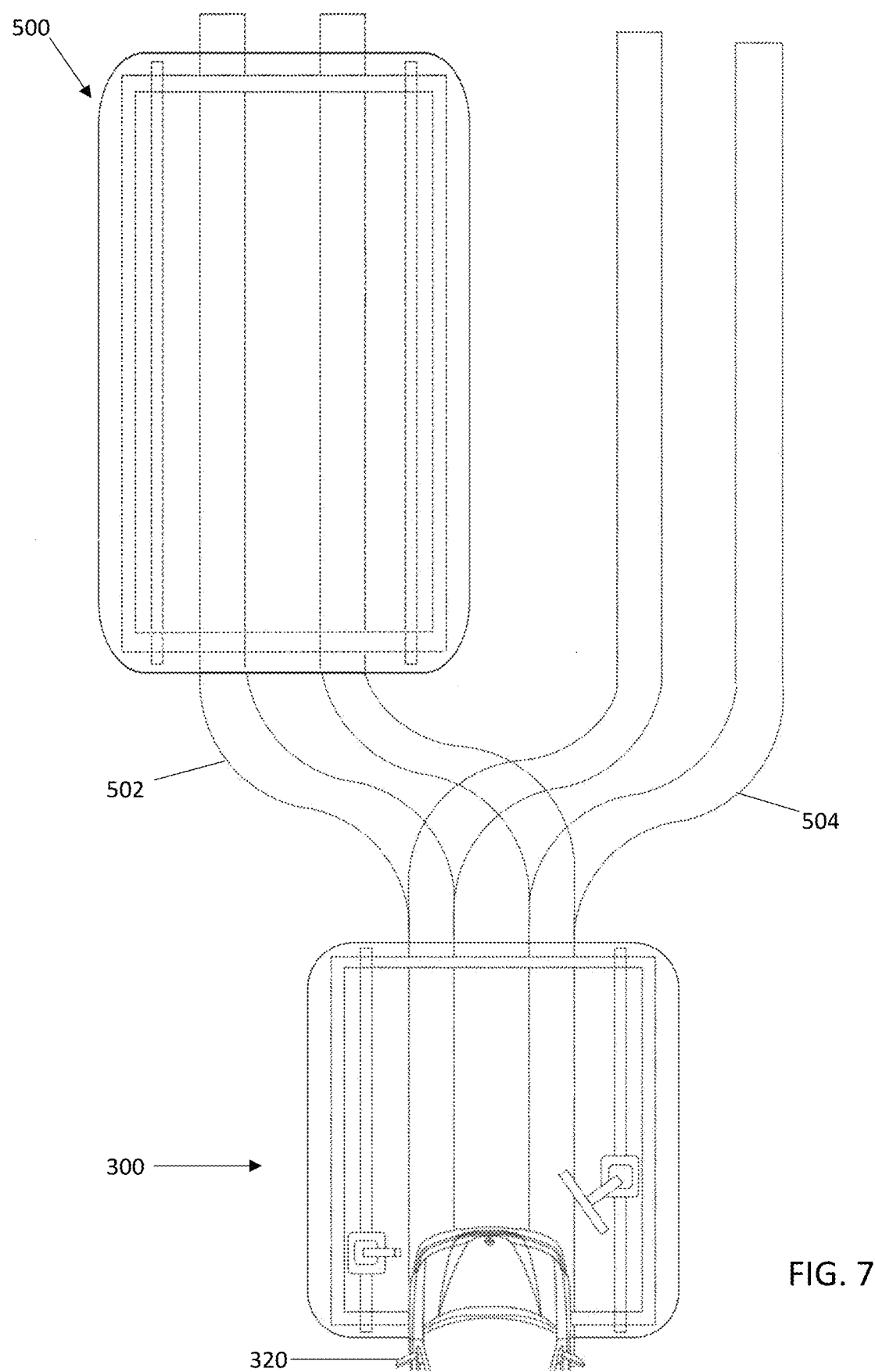
FIG. 7 illustrates a top view of an electric vehicle charging structure connected with a car wash structure according to one embodiment of the present invention.

FIG. 7 illustrates a top view of an electric vehicle charging structure connected with a car wash structure according to one embodiment of the present invention. In one embodiment, the EV charging enclosure 300 is integrated with a car wash enclosure 500. In one embodiment, if a central processor associated with the enclosure 300 receives a selection to participate in a car wash from a user device associated with a vehicle 320, then, after charging, the automatic vehicle moving system continues to automatically transport the car into a car wash enclosure 500, after which an automated car wash begins. Automated car washes are known in the prior art, including but not limited to U.S. Pat. Nos. 4,496,513 and 6,718,216, each of which is incorporated herein by reference in its entirety, and any prior system of washing a car is compatible with the present invention. One of ordinary skill in the art will understand that while enclosure 300 includes side track-based entertainment display and EV charging connector chasses, that integration of a charging enclosure and a car wash enclosure according to the present invention is not limited to only those versions including the side track-based chasses.

In one embodiment, after exiting the enclosure 300, the vehicle 320 is able to move along either a first path 502, which automatically moves the vehicle 320 toward the car wash enclosure 500, or along a second path 504, which automatically moves the vehicle 320 away from the car wash enclosure 500. In another embodiment, the system does not include a set second path 504, but rather simply releases the car from the automatic vehicle moving system if no car wash is selected. In one embodiment, the mechanism for switching which path the vehicle 320 moves along is analogous to methods of switching railroad tracks known in the prior art. In this embodiment, the path is automatically switched based on whether a central processor of the enclosure 300 receives a selection from a user device to participate in a car wash.

In one embodiment, the central processor associated with the enclosure 300 generates records of which cars enter the enclosure, the make, model, and/or type of each car entering the enclosure, when each car enters the enclosure, how much power each vehicle has stored in its battery at the present time, and/or an amount of power needed until each vehicle has a full battery. In one embodiment, the central processor is configured to transmit data concerning the vehicles entering the enclosure to at least one server. The at least one server is able to automatically populate a software application with information concerning one or more enclosures, indicating how many vehicles are currently using each enclosure and an estimated time before a free slot opens for another vehicle to begin charging in the enclosures. In one embodiment, each enclosure is operable to service about ten or about fifteen standard consumer vehicles (e.g., coupes, sedans, cars, trucks, or SUVs) simultaneously. In another embodiment, the enclosure is operable to service any number of vehicles simultaneously depending on the size of the enclosure. This application provides users with an approximate time for each charging station in an area and allows each user to more optimally select which charging enclosure to go to. In one embodiment, the at least one server is operable to receive requests from one or more user devices for reservations in one or more charging enclosures. In one embodiment, requests for reservations include a time in which the vehicle is expected to arrive, a make, model, or type of vehicle, a charging type preference (e.g., normal speed charger, fast charger, etc.), an approximate initial battery level, a desired battery level (e.g., 50%, 75%, 100%, etc.), and/or other preference information. In one embodiment, the at least one server automatically generates a queue for each enclosure based on the received requests. In one embodiment, the queue is populated based on the order in which the requests are received. In another embodiment, the queue is populated based on other factors, such as an estimated amount of charge until full for a vehicle corresponding to each received request. In one embodiment, the length of the queue and/or the specific position of a user within a queue is displayed to a user through a mobile application on a user device. By creating a virtual queue, users are able to both ensure a spot at a given charging enclosure and also check if others are planning on going to the same charging enclosure, which likely will influence which enclosure a user chooses to attend.

In one embodiment, the system described by the present invention includes an integrated food ordering service. For example, in one embodiment, a central server receives a request for food from at least one user device corresponding to a vehicle within an enclosure or which is going to shortly enter an enclosure. In another embodiment, the enclosure includes at least one microphone into which a user is able to speak to order food or a touch screen interface via which a user is able to order food. In one embodiment, a human individual records the food request ordered through the microphone while, in another embodiment, natural language processing is used to automatically record the food request. In one embodiment, the request includes an identification (ID) number (e.g., a license plate number) for the vehicle corresponding to the user and/or a description of the vehicle (e.g., a model, make, type of car, color of vehicle, etc.). In one embodiment, the food is manually run out to the car within the enclosure, providing an additional way for a driver to occupy time while charging the vehicle. In another embodiment, the food is automatically delivered by at least one food delivery robot. In one embodiment, the at least one food delivery robot identifies a location of the proper car based on visual analysis of the vehicle and/or the license plate of the vehicle to determine where to deliver the food. In one embodiment, an individual manually delivers the food into the enclosure to the vehicle. In another embodiment, a central processor of the server automatically determines a location of the vehicle within the enclosure and/or a rate that the vehicle is moving. In this embodiment, the location and/or movement rate of the vehicle is automatically transmitted to the at least one food delivery robot to allow the at least one food delivery robot to identify where to deliver the food. In one embodiment, packaging for food includes microwavable packaging, and one or more microwaves are included in the automatic vehicle moving system, providing ease of access for a robot or person delivering the food to a vehicle. In one embodiment, a server or a central processor associated with an enclosure is able to receive requests to pre-order food and/or specific entertainment options from at least one user device through a mobile application before the vehicle arrives at the enclosure, allowing for time to prepare the food before the car arrives such that the food is able to be enjoyed more easily while the car passes through the enclosure.

In one embodiment, the at least one display screen is operable to receive commands from at least one user device for changing the media content shown on the at least one display device. In one embodiment, the at least one display device is operable to show the screen of at least one user device (e.g., via APPLE AIRPLAY). In one embodiment, the at least one display screen is operable to receive remote input from a user device to log into one or more accounts associated with paid streaming services. In another embodiment, one or more entertainment options (e.g., a specific TV show, a specific film, one or more specific online videos, a specific channel, etc.) are selected at an initial display screen before entering the enclosure. Based on the selected one or more entertainment options, the at least one display device automatically displays that content while the vehicle is within the enclosure.

In one embodiment, the system of the present invention is operable to integrate with one or more existing electric vehicle charging billing systems. For example, in one embodiment, the system is able to include one or more different types of third-party proprietary charging systems (e.g., at least one TESLA charger) and automatically integrate with a billing system of the third-party proprietary charging system. By way of example and not limitation, a TESLA vehicle going through the enclosure utilizes a TESLA charger, with energy financial settlement for the electric vehicle being automatically settled through the TESLA system, while billing for use of the enclosure is handled separately. In another embodiment, billing is not handled on a car-by-car basis with a third party system. Instead, individual vehicles settle with the enclosure itself and the enclosure includes a central processor and a database operable to track the amount of charge delivered by each different type of third-party charging system and automatically settle with each third party in bulk at preset time intervals (e.g., every day, every week, every month, every year, etc.). Examples of settlement and billing systems compatible with the present invention include, but are not limited to, those described in U.S. Pat. Nos. 9,396,462, 8,836,281, 7,885,893, 10,486,541, and 10,899,235 each of which is incorporated herein by reference in its entirety.

Figure 8:
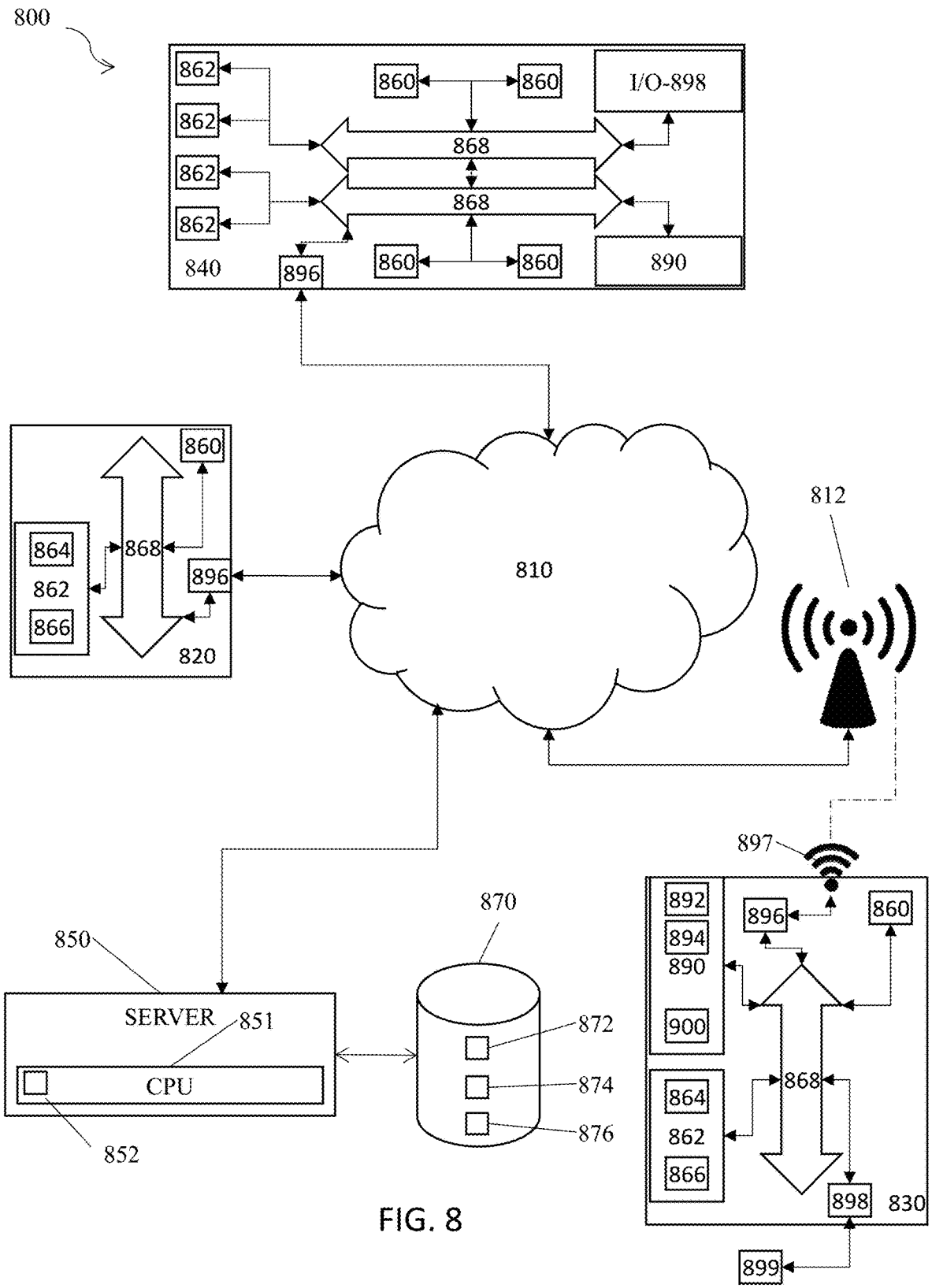
FIG. 8 is a schematic diagram of a system of the present invention.

FIG. 8 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 8, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 8, is operable to include other components that are not explicitly shown in FIG. 8, or is operable to utilize an architecture completely different than that shown in FIG. 8. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for charging a moving electric vehicle, comprising:
 an enclosure, including side walls and a roof;
 at least one automatic vehicle movement system;
 at least one entertainment display screen; and
 at least one electric vehicle (EV) charge connector;
 wherein the at least one automatic vehicle movement system is configured to receive at least one vehicle and automatically move the at least one vehicle from a first end of the enclosure to a second end of the enclosure;

wherein the at least one entertainment display screen is mounted on an entertainment chassis;
wherein the entertainment chassis is configured to move with the at least one vehicle along a first rail;
wherein the at least one EV charge connector is mounted on a charging chassis;
wherein the charging chassis is configured to move with the at least one vehicle along a second rail;
wherein the charging chassis is freestanding from the at least one automatic vehicle movement system; and
wherein the EV charging connecter chassis is operable to continue charging the at least one vehicle while being moved through the enclosure.

2. The system of claim 1, wherein the first rail and/or the second rail are suspended above the at least one vehicle.

3. The system of claim 1, wherein the enclosure includes a central operating processor configured to automatically adjust the positions, paths, and/or heights of the at least one EV charge connector and/or the at least one entertainment display screen.

4. The system of claim 3, wherein the central operating processor is operable to receive signals from at least one user device indicating a vehicle model or a type of vehicle entering the enclosure, and wherein the central operating processor automatically adjusts the heights and/or positions of the at least one EV charge connector and/or the at least one entertainment display screen based on the vehicle model or the type of vehicle.

5. The system of claim 1, wherein the at least one entertainment display screen is operable to receive commands from at least one user device to change content displayed on the at least one entertainment display screen.

6. The system of claim 1, wherein the entertainment chassis is positioned on an opposite side of the at least one automatic vehicle movement system relative to the charging chassis.

7. The system of claim 1, wherein the first rail is connected to the second rail, and wherein the entertainment chassis and the charging chassis are operable to switch positions via movement along the first rail and/or the second rail.

8. The system of claim 1, wherein the enclosure further includes at least one automatic car wash mechanism.

9. A system for charging a moving electric vehicle, comprising:
an enclosure, including side walls and a roof;
at least one automatic vehicle movement system;
at least one electric vehicle (EV) charge connector; and
a central operating processor configured to automatically adjust a position, a path, and/or a height of the at least one EV charge connector;
wherein the at least one automatic vehicle movement system is configured to receive at least one vehicle and automatically move the at least one vehicle from a first end of the enclosure to a second end of the enclosure;
wherein the at least one EV charge connector is mounted on a charging chassis;
wherein the charging chassis is configured to move with the at least one vehicle along a second rail;
wherein the charging chassis is freestanding from the at least one automatic vehicle movement system;
wherein the EV charging connecter chassis is operable to continue charging the at least one vehicle while being moved through the enclosure; and
wherein the central operating processor is operable to receive signals from at least one user device indicating a vehicle model or a type of vehicle entering the enclosure, and wherein the central operating processor automatically adjusts the heights and/or positions of the at least one EV charge connector based on the vehicle model or the type of vehicle.

10. The system of claim 9, wherein the enclosure further includes at least one automatic car wash mechanism.

11. The system of claim 9, wherein the enclosure includes at least one sensor operable to automatically confirm and/or correlate the vehicle model or the type of vehicle of a vehicle entering the enclosure with the vehicle model or the type of vehicle received from the at least one user device.

12. The system of claim 9, wherein the enclosure includes at least one control panel for ordering food and/or beverages and/or at least one server operable to receive orders of food and/or beverages from at least one user device.

13. The system of claim 12, wherein based on orders entered on the at least one control panel or the orders received from the at least one user device, at least one delivery robot automatically delivers the ordered food and/or beverages to the vehicle within the enclosure.

14. The system of claim 9, wherein the at least one automatic vehicle movement system includes depressed paths for each wheel of the at least one vehicle, at least one locking mechanism to stabilize the position of each wheel of the at least one vehicle, and at least one conveyor mechanism operable to move a surface of the depressed paths forward.

15. The system of claim 9, wherein the central operating processor is operable to transmit occupancy data to a central server, wherein the occupancy data includes a number of vehicles currently being charged by the system, a number of vehicles waiting to be charged by the system, a length of time that one or more vehicles has been charging within the system, and/or an estimated amount of time before the system is able to accept a new vehicle.

16. The system of claim 9, wherein the charging chassis is configured to autonomously recognize the at least one vehicle entering the enclosure and automatically identify a charge port on the at least one vehicle to attach to and begin charging the at least one vehicle.

17. A system for charging a moving electric vehicle, comprising:
an enclosure, including side walls and a roof;
at least one automatic vehicle movement system;
at least one electric vehicle (EV) charge connector; and
a central operating processor;
wherein the at least one automatic vehicle movement system is configured to receive at least one vehicle and automatically move the at least one vehicle from a first end of the enclosure to a second end of the enclosure;
wherein the at least one EV charge connector is mounted on a charging chassis;
wherein the charging chassis is configured to move with the at least one vehicle;
wherein the EV charging connecter chassis is operable to continue charging the at least one vehicle while being moved through the enclosure; and
wherein the central operating processor is operable to transmit occupancy data to a central server, wherein the occupancy data includes a number of vehicles currently being charged by the system, a number of vehicles waiting to be charged by the system, a length of time that one or more vehicles has been charging within the system, and/or an estimated amount of time before the system is able to accept a new vehicle.

18. The system of claim 17, wherein the enclosure includes at least one control panel for ordering food and/or beverages and/or at least one server operable to receive orders of food and/or beverages from at least one user device.

19. The system of claim 18, wherein based on orders entered on the at least one control panel or the orders received from the at least one user device, at least one delivery robot automatically delivers the ordered food and/or beverages to the vehicle within the enclosure.

20. The system of claim 17, wherein the charging chassis is configured to autonomously recognize the at least one vehicle entering the enclosure and automatically identify a charge port on the at least one vehicle to attach to and begin charging the at least one vehicle.

* * * * *